US012420645B1

(12) United States Patent
Ramamoorthy et al.

(10) Patent No.: US 12,420,645 B1
(45) Date of Patent: Sep. 23, 2025

(54) METHODS AND APPARATUS FOR PERFORMING HILL HOLD WITH REDUCED OSCILLATIONS IN VEHICLE POSITION

(71) Applicant: Motiv Power Systems, Inc., Foster City, CA (US)

(72) Inventors: Krishnakumar Ramamoorthy, Foster City, CA (US); Tai-Sik Hwang, San Jose, CA (US); James Michael Castelaz, Alameda, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 110 days.

(21) Appl. No.: 18/102,575

(22) Filed: Jan. 27, 2023

Related U.S. Application Data

(60) Provisional application No. 63/267,478, filed on Feb. 2, 2022.

(51) Int. Cl.
*B60L 15/20* (2006.01)

(52) U.S. Cl.
CPC .......... *B60L 15/20* (2013.01); *B60L 2240/12* (2013.01); *B60L 2240/14* (2013.01);
(Continued)

(58) Field of Classification Search
CPC ................ B60L 15/20; B60L 2240/12; B60L 2240/642; B60L 2240/421; B60L 2240/26; B60L 2240/14
(Continued)

(56) References Cited

U.S. PATENT DOCUMENTS

| 4,747,269 A | * | 5/1988 | David | ................ F16H 39/18 |
| | | | | 60/489 |
| 4,856,357 A | * | 8/1989 | David | ................ F16H 25/06 |
| | | | | 74/216.3 |

(Continued)

FOREIGN PATENT DOCUMENTS

| CN | 117227830 A | * | 12/2023 | |
| DE | 102007055085 A1 | * | 5/2009 | ...... B60W 30/18118 |

(Continued)

OTHER PUBLICATIONS

Chen, Li, Gang Xi, and Jing Sun. "Torque Coordination Control During Mode Transition for a Series-Parallel Hybrid Electric Vehicle." IEEE transactions on vehicular technology 61.7 (2012): 2936-2949. Web. (Year: 2012).*

*Primary Examiner* — Peter D Nolan
*Assistant Examiner* — Keith A von Volkenburg
(74) *Attorney, Agent, or Firm* — Adibi IP Group, PC; Amir V. Adibi; Andrew C. Palmer (57) ABSTRACT

Methods and apparatus for hill hold in an electric vehicle are disclosed. In one embodiment, a system includes a motor and a controller operable in a hill hold control mode. The motor is coupled to one or more wheels of a vehicle. In the hill hold control mode, the controller controls the motor to generate a holding torque to maintain a vehicle speed at zero. The holding torque prevents a change in vehicle position. The holding torque opposes changes in the road grade, the shaft stiffness, or the vehicle weight to prevent oscillations in the vehicle position. The controller uses at least one of road grade, shaft stiffness, and vehicle weight to control the motor to generate the holding torque. The hill hold control mode operates across a range of vehicle weights, a range of shaft stiffnesses, and a range of road grades, without additional tuning of the controller.

18 Claims, 8 Drawing Sheets

(52) U.S. Cl.
CPC ..... *B60L 2240/26* (2013.01); *B60L 2240/421* (2013.01); *B60L 2240/642* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 5,337,628 | A * | 8/1994 | Hendriks | B60W 10/02 |
| | | | | 477/48 |
| 10,821,977 | B1 * | 11/2020 | Stein | B60W 10/08 |
| 2004/0055799 | A1 * | 3/2004 | Atarashi | B60W 10/18 |
| | | | | 903/906 |
| 2004/0204291 | A1 * | 10/2004 | Atarashi | B60W 10/184 |
| | | | | 903/945 |
| 2005/0272555 | A1 * | 12/2005 | Tabata | B60W 10/02 |
| | | | | 477/2 |
| 2008/0190680 | A1 * | 8/2008 | Kaneko | B60L 58/20 |
| | | | | 180/170 |
| 2010/0250056 | A1 * | 9/2010 | Perkins | B60T 8/175 |
| | | | | 701/90 |
| 2014/0067153 | A1 * | 3/2014 | Yu | G01L 3/00 |
| | | | | 701/1 |
| 2014/0067154 | A1 * | 3/2014 | Yu | G06F 17/00 |
| | | | | 701/1 |
| 2014/0067240 | A1 * | 3/2014 | Yu | G06F 17/00 |
| | | | | 701/1 |
| 2015/0180386 | A1 * | 6/2015 | Enoki | H02P 6/10 |
| | | | | 318/400.23 |
| 2020/0186071 | A1 * | 6/2020 | Moule | H02P 21/14 |
| 2020/0216085 | A1 * | 7/2020 | Bobier-Tiu | B60W 40/08 |
| 2020/0366223 | A1 * | 11/2020 | Coroban-Schramel | H02P 6/08 |
| 2021/0114583 | A1 * | 4/2021 | Flores Aviña | G01C 21/26 |

FOREIGN PATENT DOCUMENTS

| | | | | |
|---|---|---|---|---|
| EP | 4464537 | A1 * | 11/2024 | ............. B60L 15/20 |
| KR | 20230077820 | A * | 6/2023 | |

* cited by examiner

FIG. 1

ELECTRIC VEHICLE
FIG. 2

| PARAMETER NAME | SYMBOL | VALUE | UNIT |
|---|---|---|---|
| Motor angular moment of inertia | JMO | 0.25 - 2.5 | Kg-m2 |
| Load angular moment of inertia | JL | 43 - 62 | Kg-m2 |
| Elasticity coefficient of the shaft | Ks | 800 - 2400 | Nm/rad |

FIG. 8B

UPHILL FORWARD DRIVE HILLHOLD
(15% GRADE - 6 INCH ROLLBACK)
FIG. 9A

DOWNHILL REVERSE DRIVE HILLHOLD
(15% GRADE - 6 INCH ROLLBACK)
FIG. 9B

METHODS AND APPARATUS FOR PERFORMING HILL HOLD WITH REDUCED OSCILLATIONS IN VEHICLE POSITION

CROSS REFERENCE TO RELATED APPLICATIONS

This application claim the benefit under 35 U.S.C. § 119 from U.S. Provisional Patent Application Ser. No. 63/267,478, entitled "Methods And Apparatus For Performing Hill Hold With Reduced Oscillations In Vehicle Position," filed on Feb. 2, 2022, the subject matter of which is expressly incorporated herein by reference.

TECHNICAL FIELD

The described embodiments relate to electric vehicles, and more particularly, the drivetrain system within electric vehicles.

BACKGROUND INFORMATION

A typical electric vehicle drivetrain includes an electric motor that outputs motor torque that is coupled through a drive shaft to the vehicle's wheels. During operation of the vehicle on an uphill grade, motor torque is not applied to the vehicle's wheels while the vehicle is stationary and the driver is holding the vehicle's position with the service brakes. When the brakes are released, a hill hold function is activated to maintain the vehicle's position.

During hill hold, motor torque is applied to the wheels through the drive shaft. The motor torque opposes the load torque experienced by the vehicle's wheels as the weight of the vehicle causes the vehicle to roll backwards down the uphill grade.

SUMMARY

In various embodiments, methods and apparatus are disclosed for hill hold in an electric vehicle. In accordance with at least one novel aspect, a hill hold function is provided to maintain the position of an electric vehicle when on a roadway having a sloped grade. The hill hold function accounts for the weight of the vehicle, drive shaft stiffness, and road grade to precisely generate motor torque to oppose the load torque experienced by the wheels. As a result, position oscillations of the vehicle are reduced or eliminated.

In one embodiment, an apparatus is provided that includes a motor coupled to one or more wheels of a vehicle, and a controller that causes the motor to generate a holding torque using at least one of road grade, shaft stiffness, and vehicle weight so that the holding torque prevents a change in vehicle position.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
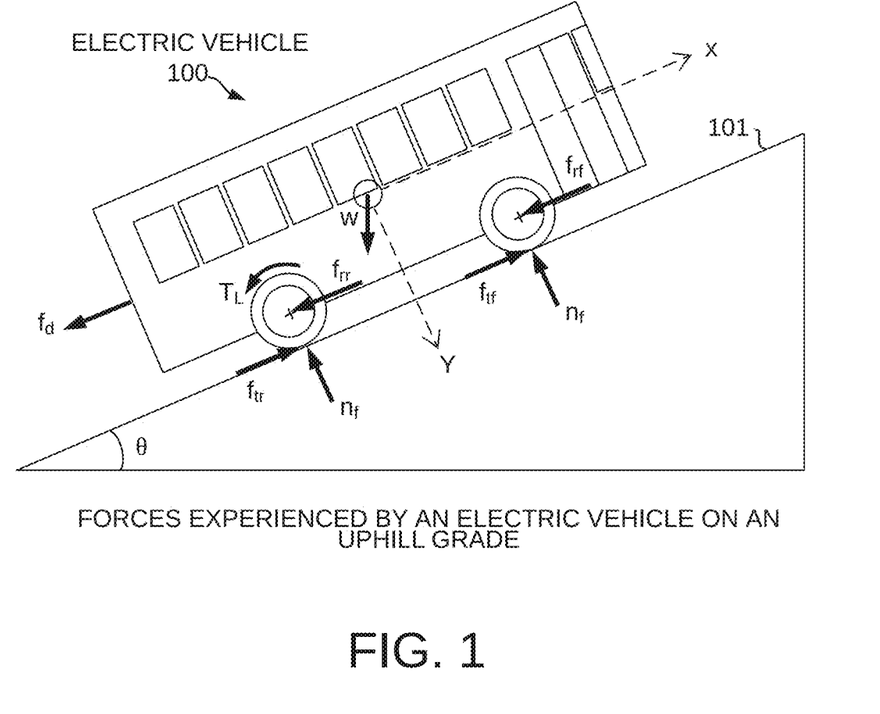
FIG. 1 is a diagram showing the various forces experienced by an electric vehicle on an uphill grade.

FIG. 1 is a diagram of the forces experienced by an electric vehicle 100 on an uphill grade 101. The electric vehicle 100 includes a drivetrain that comprises an electric motor coupled through a drive shaft to the vehicle's wheels.

The grade 101 is sloped upward at an angle theta ($\theta$). A force representing the weight (W) of the vehicle 100 due to gravity is shown. A downward force ($f_d$) acts on the electric vehicle 100 forcing the vehicle 100 backwards down the uphill grade 101. A traction force ($f_{tr}$) and a rolling force ($f_{rr}$) act upon the rear wheels. A traction force ($f_{tf}$) and a rolling force ($f_{rf}$) act on the front wheels. A normal force ($n_f$) opposes gravity and is shown acting on the front and rear wheels. The downward force ($f_d$) is a net force that must be overcome to maintain the electric vehicle 100 in a stationary position. The downward force ($f_d$) results in a load torque ($T_L$) on the vehicle's wheels as shown.

During operation, a driver engages the vehicle's brakes on the uphill grade 101 until the electric vehicle 100 comes to a complete stop. Eventually, the driver will want to disengage the brakes and engage the accelerator to activate the drivetrain to drive the electric vehicle 100 forward and up the rest of the uphill grade 101. However, between disengaging the brakes and engaging the accelerator, the electric vehicle 100 may undesirably roll backwards down the uphill grade 101 due in part to the downward force ($f_d$). During this time, a hill hold function is enabled to maintain the vehicle's position. The hill hold function provides motor torque through the drive shaft to the wheels to oppose the load torque acting on the wheels. Conventional hill hold functions may result in oscillations in the vehicle's position because the motor torque that is provided does not exactly oppose the load torque experienced by the wheels.

In accordance with at least one novel aspect, a hill hold function is provided that accounts for the weight of the vehicle, drive shaft stiffness, and road grade to more precisely generate motor torque to oppose the load torque experienced by the wheels. As a result, position oscillations are reduced or eliminated.

Figure 2:
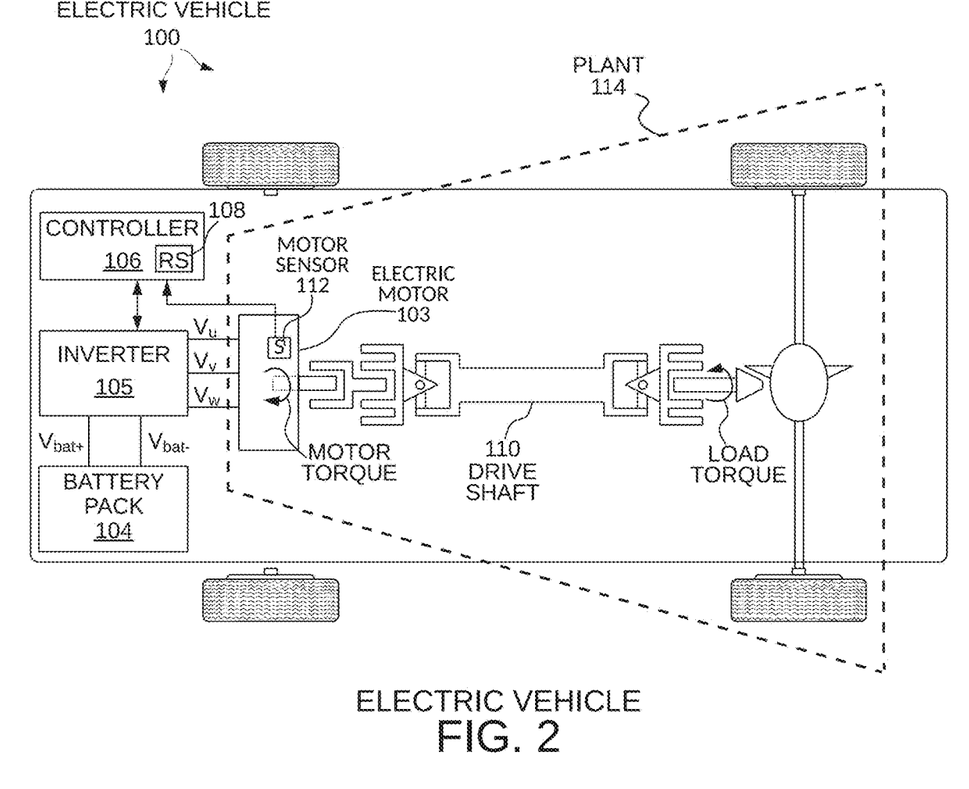
FIG. 2 is a high-level diagram of a drivetrain of the electric vehicle.

FIG. 2 is a high-level diagram of a drivetrain of the electric vehicle 100. In this example, the electric vehicle 100 has an electric motor 103 that generates motor torque as part of plant 114. The plant 114 also comprises a drivetrain and wheel assemblies as shown. The electric motor 103 is powered by a voltage source 104. In this example, the voltage source 104 is a battery pack. An inverter 105 receives a DC voltage from the battery pack 104 and generates three motor voltage waveforms $V_U$, $V_V$, and $V_W$ that are supplied to and control the electric motor 103. The battery pack 104 outputs a positive voltage $V_{BAT+}$ onto a positive DC supply voltage conductor and outputs a negative voltage $V_{BAT-}$ onto a negative DC supply voltage conductor.

A controller 106 controls the inverter 105 to drive the electric motor 103 in a desired fashion by drawing power from the battery pack 104. In one example, the controller 106 is an integrated circuit having a processor and a memory. The controller 106 comprises a resonance suppression (RS) control circuit 108 that controls the inverter 105 to drive the electric motor 103 to provide a hill hold function that reduces or eliminates position oscillations of the vehicle during hill hold.

The electric vehicle 100 has a drivetrain that includes the motor 103 and a drive shaft 110 that transfers the mechanical energy output from the motor 103 to the wheels. For example, during hill hold, motor torque generated by the electric motor 103 is transferred through the drive shaft 110 to one or more of the wheels to oppose load torque experienced by the wheels. The motor 103 also includes a motor sensor 112 that senses motor position and speed and communicates this information to the controller 106. Additional descriptions of the resonance suppression (RS) control circuit 108 are provided below.

Figure 3:
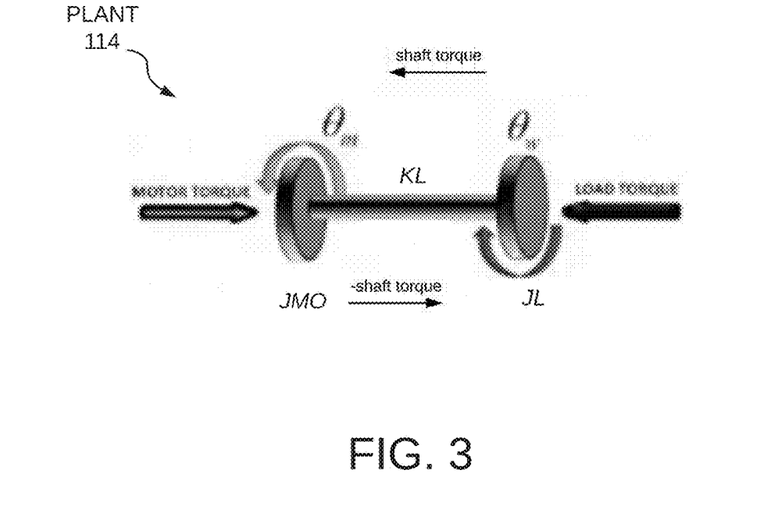
FIG. 3 is a diagram of a plant that processes various torque signals in an electric vehicle during operation of a hill hold function.

FIG. 3 is a diagram of plant 114 that shows various sources of torque in an electric vehicle during operation of a hill hold function. The plant 114 receives voltage waveforms as an input and load torque as an input. The plant 114 outputs a motor speed signal based on the motor torque, load torque, driveshaft properties, and a motor sensor. The wheels experience a load torque due to the weight of the vehicle, forces applied to the vehicle, and the grade of the road surface. A motor torque is applied to a drive shaft that produces a shaft torque that is applied to the wheels. The stiffness of the drive shaft determines how the motor torque is applied to the wheels to oppose the load torque. In various embodiments, the resonance suppression (RS) control circuit 108 operates to precisely generate motor torque to oppose the load torque thereby reducing or eliminating position oscillations of the vehicle.

Figure 4:
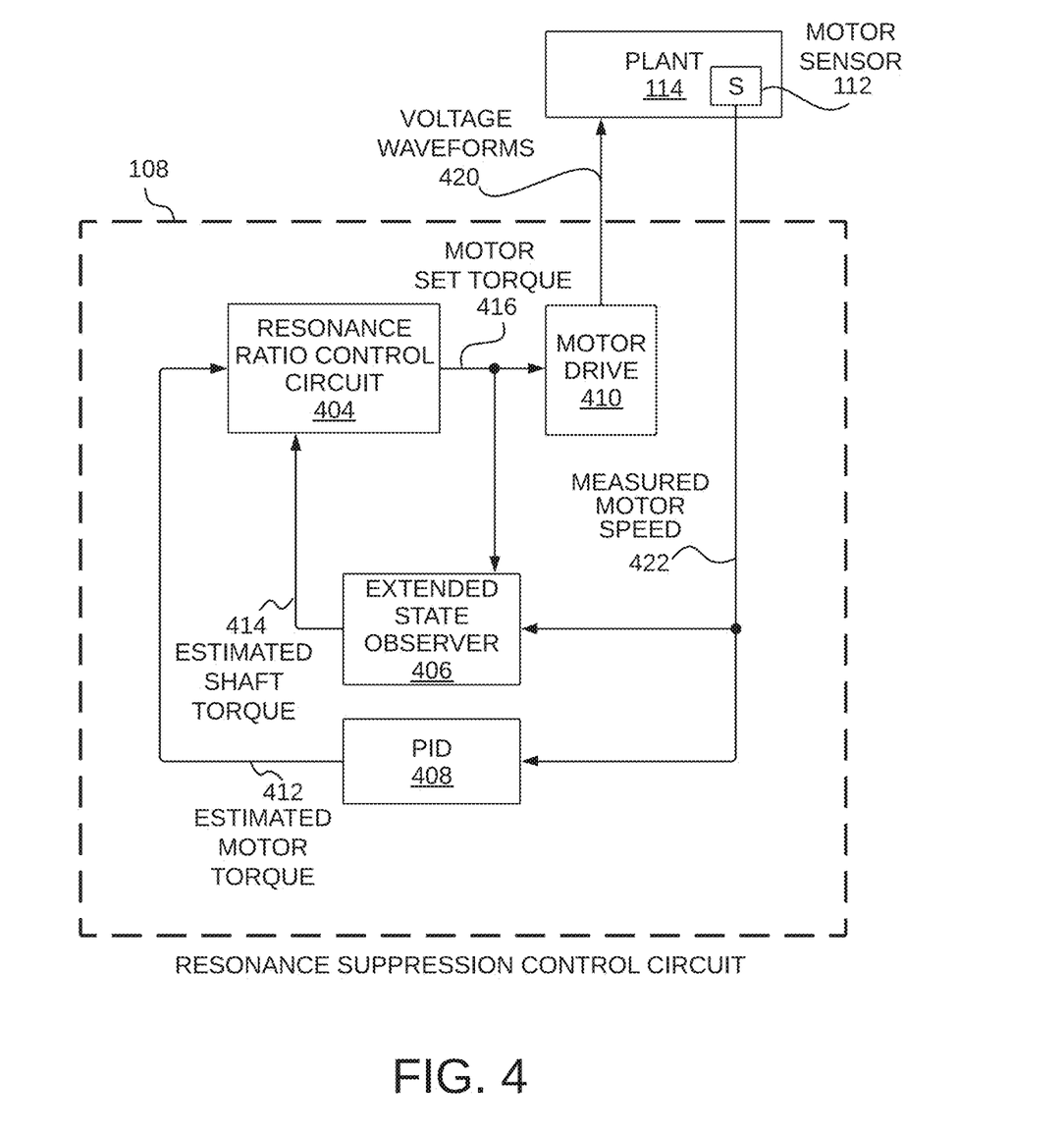
FIG. 4 shows a block diagram of the resonance suppression (RS) control circuit shown in FIG. 2.

FIG. 4 shows a block diagram of the resonance suppression (RS) control circuit 108 shown in FIG. 2. In this embodiment, the resonance suppression control circuit 108 comprises resonance ratio control circuit 404, extended state observer 406, motor drive 410, and Proportional Integral Derivative (PID) controller 408. In various embodiments, the functional blocks of resonance suppression (RS) control circuit 108 each comprise at least one component selected from a set that includes a state machine, processor, CPU, programmable gate array, RAM, ROM, memory, programmable logic, discrete logic devices, and discrete analog devices. In one embodiment, the resonance suppression control circuit 108 comprises one or more integrated circuits.

The plant 114 receives motor voltage waveforms 420 from motor drive circuit 410 and generates a measured motor speed signal 422. The PID 408 receives the measured motor speed signal 422 and generates an estimated motor torque signal 412. The extended state observer 406 receives the motor set torque signal 416 and the measured motor speed signal 422 and generates an estimated shaft torque signal 414. The resonance ratio control circuit 404 receives the estimated motor torque signal 412 and the estimated shaft torque signal 414 and generates the motor set torque signal 416.

In various embodiments, the combination of the extended state observer 406 and the resonance ratio control circuit 404 operate to shift the resonant frequency of the circuit 108 to reduce or eliminate vehicle position oscillations.

Figure 5:
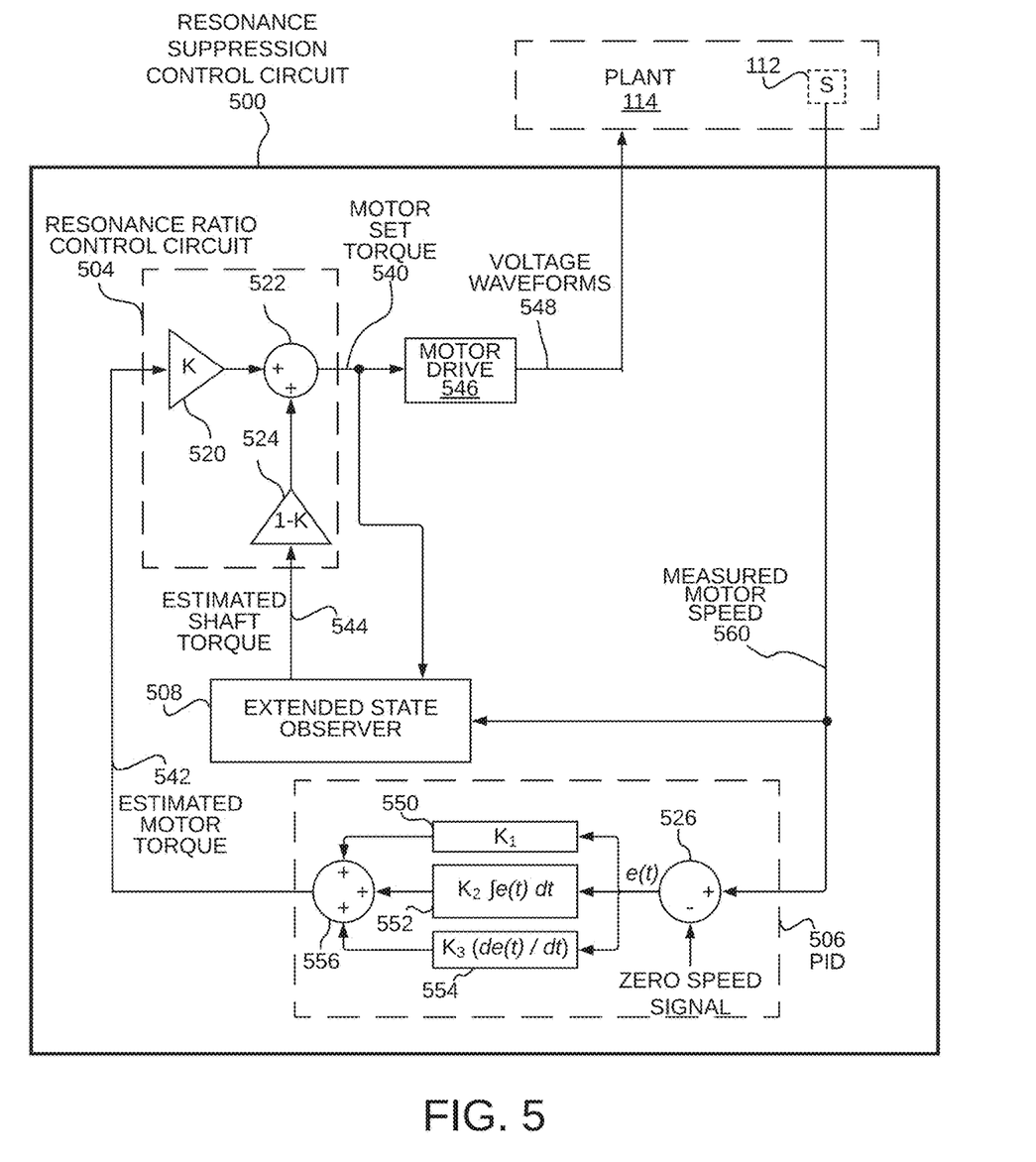
FIG. 5 shows a detailed embodiment of the resonance suppression control circuit shown in FIG. 4.

FIG. 5 shows a detailed embodiment of a resonance suppression control circuit 500. For example, the resonance suppression control circuit 500 is suitable for use as the resonance suppression control circuit 108 shown in FIGS. 2 and 4. In this embodiment, the circuit 500 comprises resonance ratio control circuit 504, PID circuit 506, motor drive 546, and extended state observer 508.

The plant 114 receives motor voltage waveforms 548 from the motor drive circuit 546 and a load torque from the wheels (not shown) to generate an observed or measured motor speed signal 560. The motor drive circuit 546 generates the voltage waveforms 548 from a motor set torque signal 540 that is output from the resonance ratio control circuit 504.

The PID 506 comprises summation circuits 526 and 556, proportional control circuit 550, integral control circuit 552, and derivative control circuit 554. The summation circuit 526 receives the measured motor speed signal 560 at a first (+) input and a voltage level representing zero speed signal (e.g., zero volts) at a first (−) input. The summation circuit 526 performs a summation of its input signals to generate a summation output signal (e(t)) (e.g., error signal) that is input to the proportional control circuit 550, which scales the signal e(t) by a first constant ($K_1$). The integral control circuit 552 also receives the summation output signal (e(t)) and integrates this value before scaling the integration result by a second constant ($K_2$). The derivative control circuit 554 also receives the summation output signal (e(t)) and differentiates and scales the input by a third constant ($K_3$). The outputs of the proportional control circuit 550, integral control circuit 552, and derivative control circuit 554 are summed by the summation circuit 556 to generate an estimated motor torque signal 542.

Figure 7:
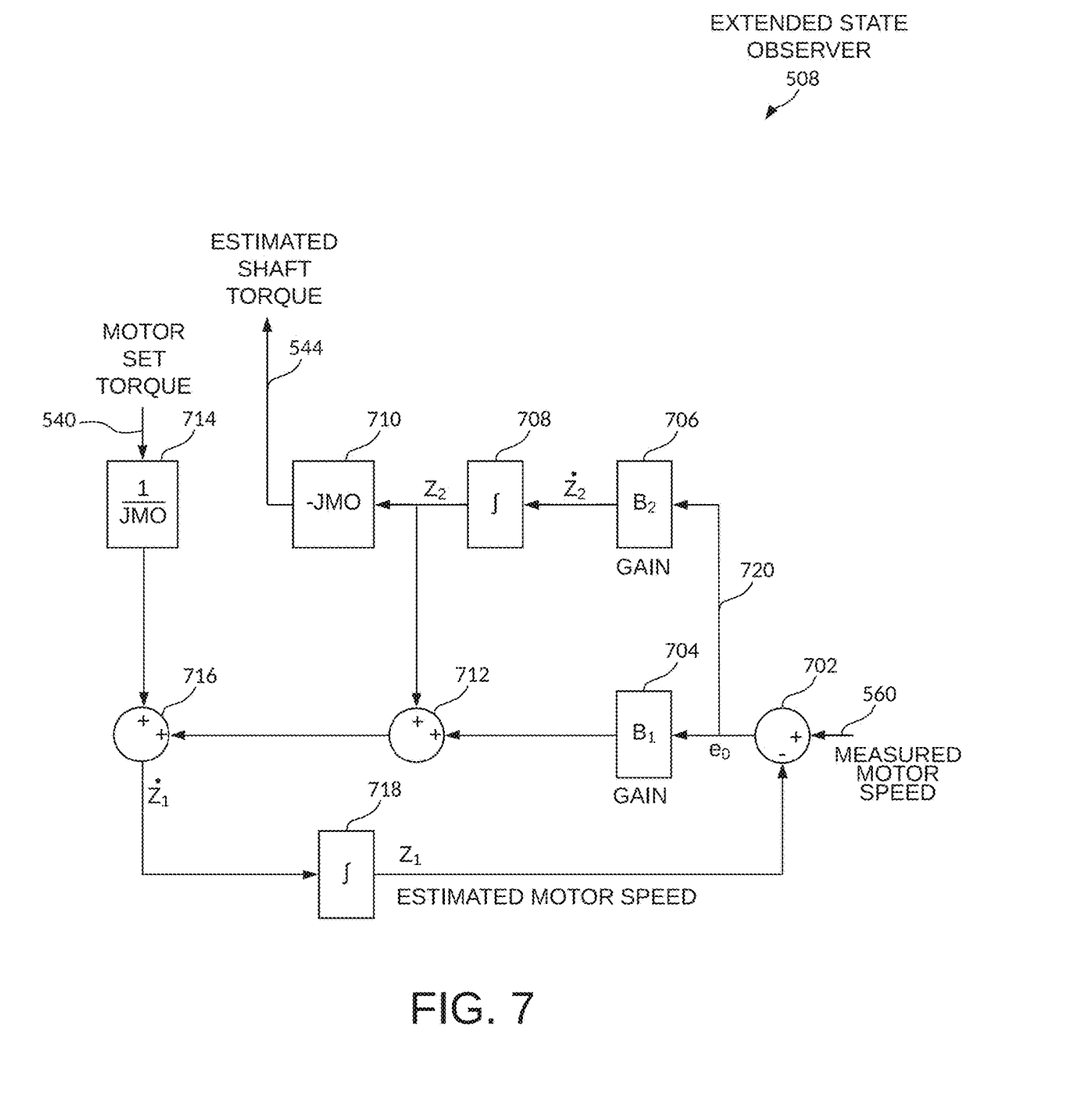
FIG. 7 shows an exemplary embodiment of an extended state observer (ESO) for use in the resonant suppression control circuit shown in FIG. 5.

The extended state observer 508 receives the measured motor speed signal 560 and motor set torque signal 540. The extended state observer 508 generates an estimated shaft torque signal 544 from the measured motor speed signal 560 and motor set torque signal 540. A detailed block diagram of one embodiment of the extended state observer 508 is shown in FIG. 7.

The resonance ratio control circuit 504 comprises summation circuit 522 and gain circuits 520 and 524. The gain circuit 520 receives at its input the estimated motor torque signal 542 and applies a gain of (K) to generate an output signal that is input to a first (+) input of the summation circuit 522. The gain circuit 524 receives at its input the estimated shaft torque signal 544 and applies a gain of (1−K) to generate an output signal that is input to a second (+) input of the summation circuit 522. The summation circuit 522 performs a summation of its input signals to generate the motor set torque signal 540.

Figure 6:
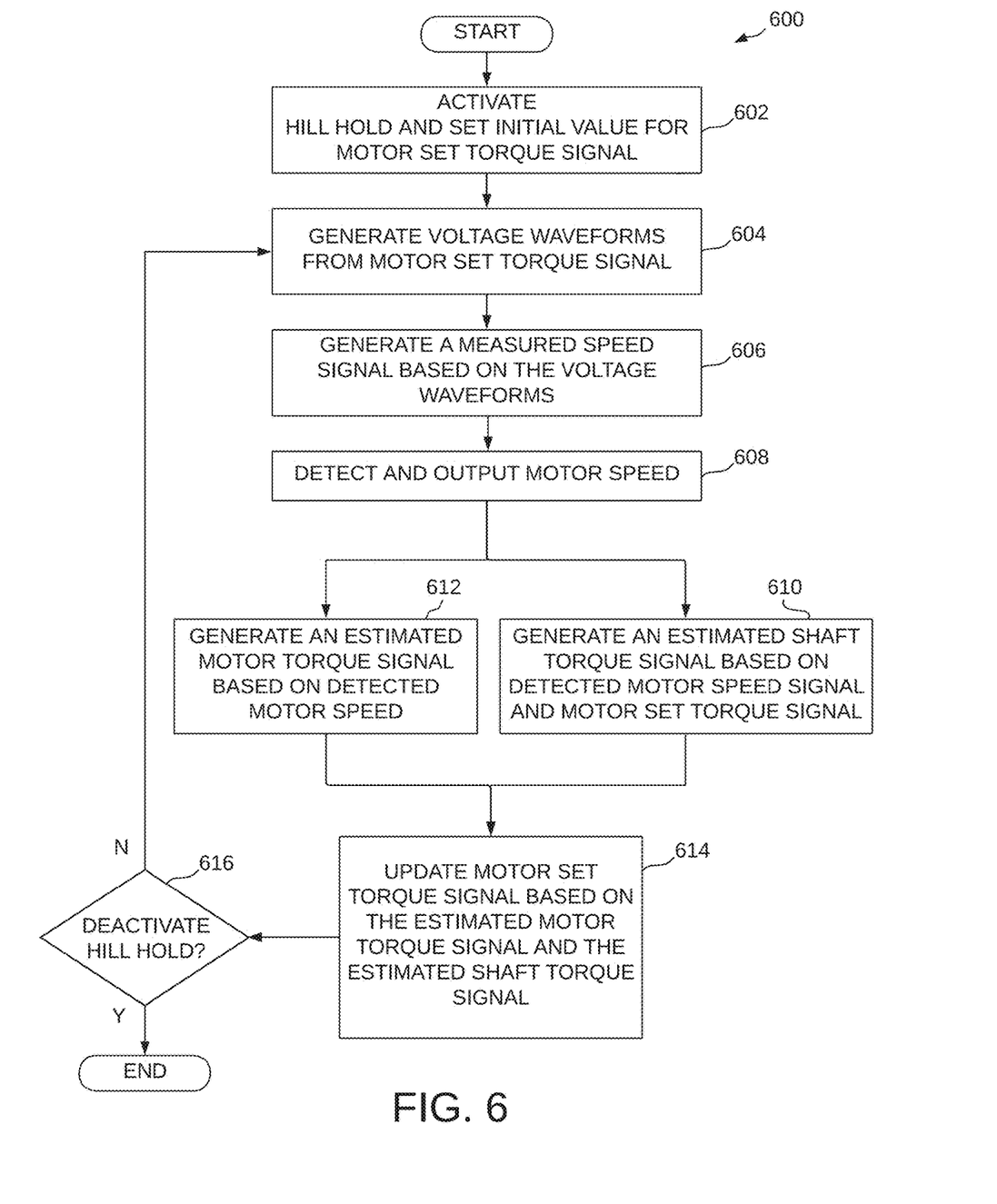
FIG. 6 shows an embodiment of a method for reducing vehicle position oscillations during a hill hold operation.

FIG. 6 shows an embodiment of a method 600 for reducing vehicle position oscillations during a hill hold operation. For example, method 600 is suitable for use with the resonance suppression control circuit 500 to reduce or eliminate vehicle position oscillations during a hill hold operation.

At block 602, a hill hold operation is activated in an electric vehicle to maintain vehicle position on a roadway having a sloped grade. For example, the resonance suppression control circuit 500 is activated as part of the hill hold operation.

At block 604, motor voltage waveforms are generated based on a motor set torque signal. For example, in FIG. 5, the motor drive circuit 546 receives the motor set torque signal 540 and generates the motor voltage waveforms 548.

At block 606, a measured motor speed signal is generated by a plant based on the voltage waveforms. For example, the plant 114 generates the measured motor speed signal 560 based on the voltage waveforms 548 applied to an electric motor 103 coupled to a driveshaft 110 and load torque. The plant 114 then generates a measured motor speed signal 560 from the motor speed using a motor sensor 112 (see FIG. 2).

At block 608, a measured motor speed signal is detected and output. For example, the motor sensor 112 inside the plant 114 generates and outputs the measured motor speed signal 560.

At block 610, an estimated shaft torque signal is generated based on the measured motor speed signal and the motor set torque signal. For example, the extended state observer 508 receives the measured motor speed signal 560 and the motor set torque signal 540 and generates the estimated shaft torque signal 544.

At block 612, an estimated motor torque signal is generated based on the detected motor speed. For example, the PID 506 receives the measured motor speed signal 560 and generates the estimated motor torque signal 542.

At block 614, the motor set torque signal is set based on the estimated shaft torque signal and estimated motor torque signal. For example, the resonance ratio control circuit 504 receives the estimated shaft torque signal 544 and the estimated motor torque signal 542 and generates the motor set torque signal 540.

At block 616, a determination is made as to whether to exit the hill hold procedure. If it is determined to continue the hill hold procedure, the method then proceeds to block 604 where the motor set torque signal 540 is input to the motor drive circuit 546 to generate the motor voltage waveforms 548 that are input to the plant 114. If it is determined to end the hill hold procedure, the method ends. For example, if the vehicle brake is applied, the hill hold procedure is exited.

Thus, the method 600 operates to control a vehicle drivetrain to reduce or minimize vehicle position oscillations and rollback. It should be noted that the operations of method 600 are exemplary, and not exhaustive, and that the operations may be changed, modified, rearranged, combined, deleted, and/or added to within the scope of the embodiments.

FIG. 7 shows an exemplary embodiment of an extended state observer (ESO) 508 for use in the resonant suppression control circuit shown in FIG. 5.

In one embodiment, the ESO 508 comprises summation circuits (702, 712, and 716), gain stages B1, B2 (704 and 706), and integrators (708 and 718). The ESO 508 also comprises multipliers (710 and 714).

During operation, the summation circuit 702 receives the measured motor speed 560 and subtracts an estimated motor speed ($Z_1$), which is output from the integrator 718, to generate a summation output $e_0$ (720) that is input to the gain stages 704 and 706. The gain stage 704 applies a first gain factor (B1) to the $e_0$ output to generate a gain-adjusted signal that is input to the summation circuit 712. The gain stage 706 applies a second gain factor (B2) to the $e_0$ output to generate a gain-adjusted signal that is input to the integrator 708.

The integrator 708 integrates the gain-adjusted signal output from the gain stage 706 to generate an integrated signal ($Z_2$) that is input to the multiplier 710 and the summation circuit 712. The multiplier 710 multiplies the integrated signal $Z_2$ by a factor (−JMO) to generate the estimated shaft torque signal 544. The factor (−JMO) represents the motor angular moment of inertia.

The summation circuit 712 sums the output of the integrator 708 with the output of the gain circuit 704 to generate a sum that is input to the summation circuit 716. The motor set torque signal 540 is multiplied by a factor (1/JMO) by the multiplier 714 to generate a multiplied output signal that is also input to the summation circuit 716.

The summation circuit 716 sums the signals at its inputs to generate a summation output that is input to the integrator 718, which integrates the signal it receives to generate the estimated motor speed ($Z_1$) that is input to the summation circuit 702. Thus, the ESO 508 generates the estimated shaft torque signal 544 based on the received measured motor speed 560 and the motor set torque signal 540.

Figure 8A:
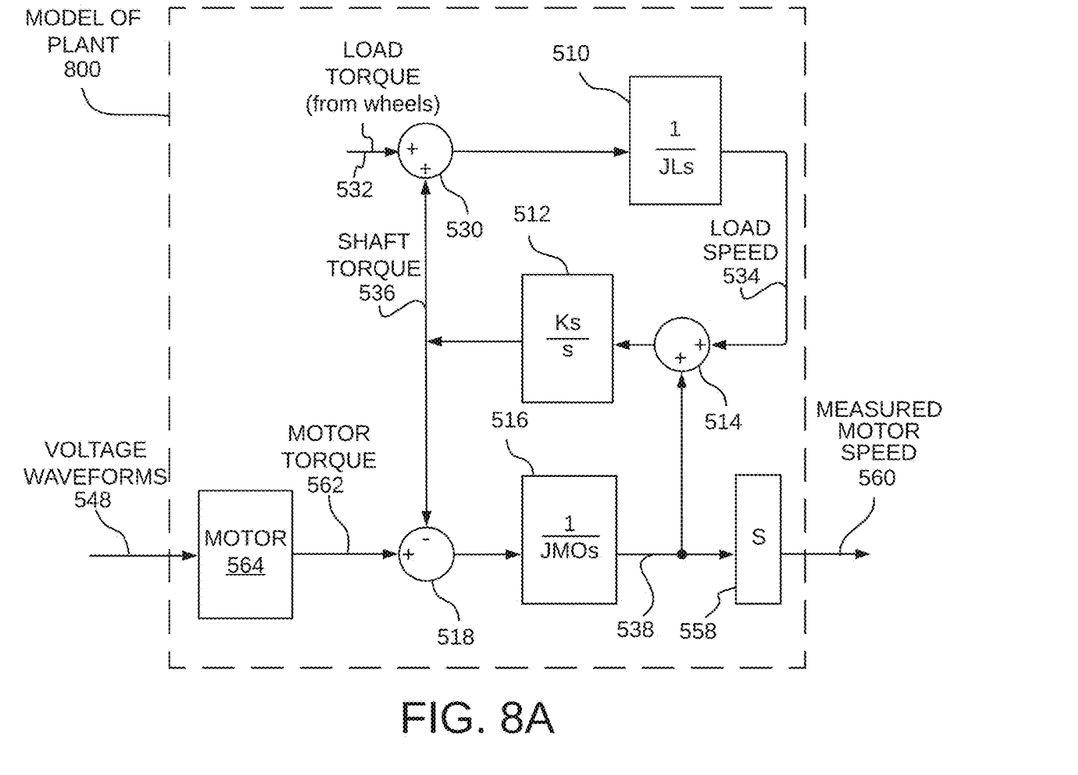
FIG. 8A shows an exemplary embodiment of a model for a plant for use with the resonant suppression control circuit shown in FIG. 5.

FIG. 8A shows an exemplary embodiment of a model of a plant 800 for use with the resonant suppression control circuit shown in FIG. 5. The plant model 800 comprises summation circuits 530, 514, and 518, motor model 564, speed sensor model(S) 558, and integrator circuits 510, 512, and 516. A load torque signal 532 is received at a first (+) input of the summation circuit 530. The summation circuit 530 also receives a shaft torque signal 536 at a second (+) input. The summation circuit 530 performs a summation of its input signals to generate a summation output signal that is input to the integrator 510. The integrator 510 multiplies the signal at its input by a factor of (1/JL) and integrates to generate a load speed signal 534 that is input to a first (+) input of the summation circuit 514. A motor speed signal 538 is received at a second (+) input of the summation circuit 514. The summation circuit 514 performs a summation of its input signals to generate a summation output signal that is input to the integrator 512. The integrator 512 multiplies the signal at its input by a factor of (K) and integrates to generate the shaft torque signal 536 that is input to the summation circuit 530 and to a (−) input of the summation circuit 518. The motor 564 receives motor voltage waveforms 548 and generates a motor torque signal 562 that is input to a (+) input of the summation circuit 518. The summation circuit 518 performs a summation of its input signals to generate a summation output signal that is input to the integrator 516. The multiplier 516 multiplies the signal at its input by a factor of (1/JMO) and integrates to generate the motor speed signal 538. The speed sensor model 558 receives the motor speed signal 538 and generates an observed or measured motor speed signal 560.

Figure 8B:
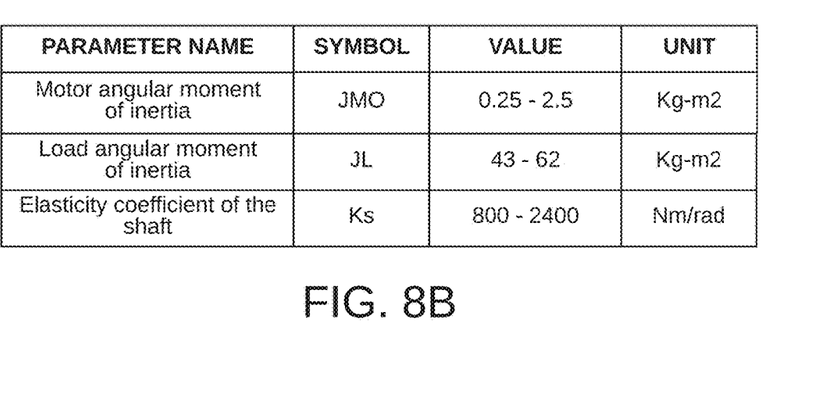
FIG. 8B shows Table 1 comprising exemplary parameters for use to analyze the model of the plant shown in FIG. 8A.

FIG. 8B shows a table of exemplary parameters for the model of the plant 800 shown in FIG. 8A. These parameters and values can be used to evaluate the operation of the model of the plant 800 in accordance with embodiments of the invention.

Figure 9A:
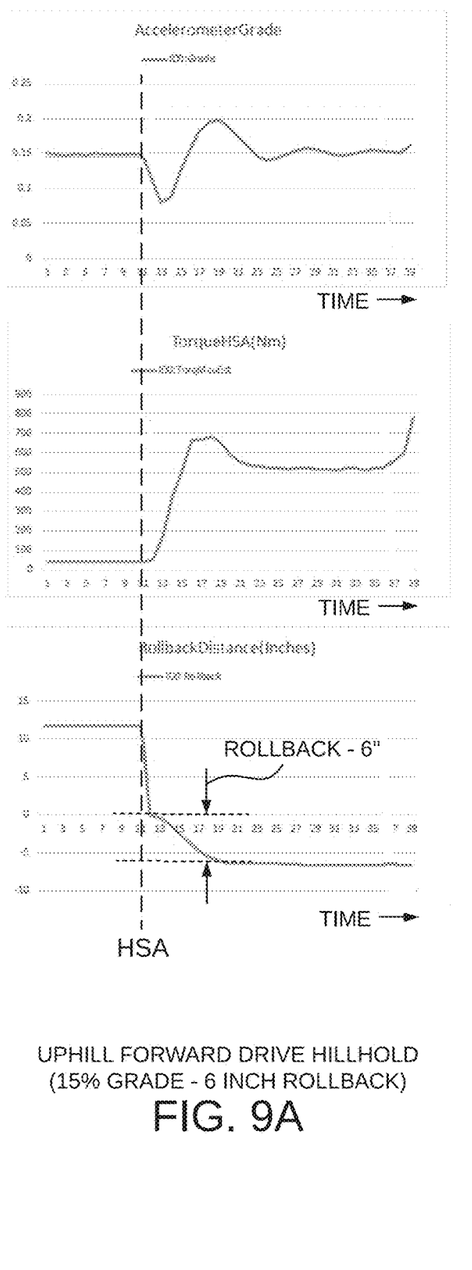
FIGS. 9A-B show graphs illustrating the operation of the resonance suppression control circuit shown in FIG. 5 to provide hill hold during uphill and downhill vehicle operation.
Figure 9B:
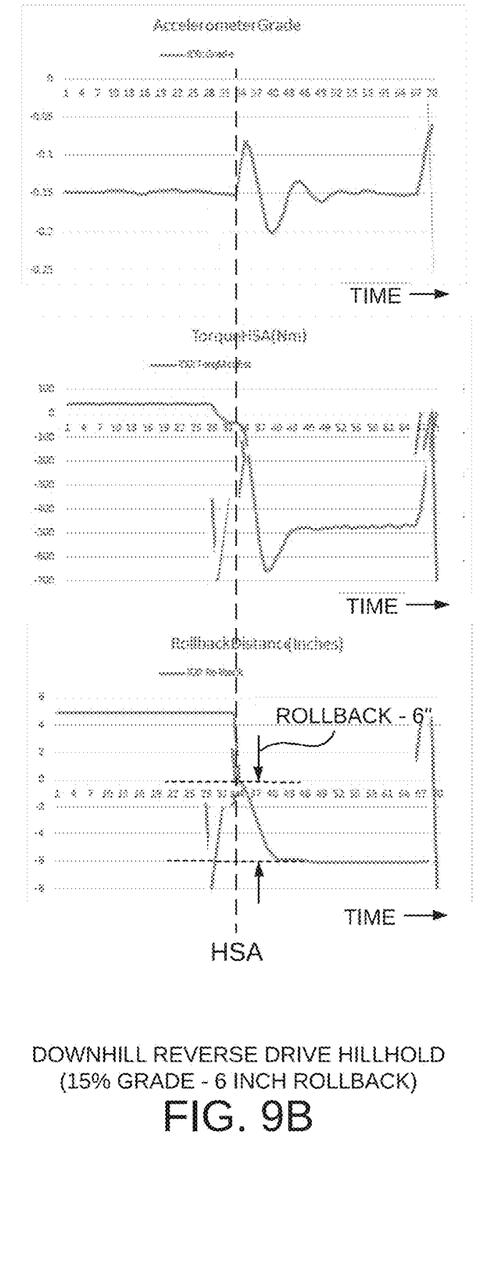

FIGS. 9A-B show graphs illustrating the operation of the resonance suppression control circuit shown in FIG. 5. For example, FIG. 9A shows a first set of graphs that illustrate the operation of the resonance suppression control circuit 500 to provide hill hold during uphill vehicle operation. FIG. 9B shows a second set of graphs that illustrate the operation of the resonance suppression control circuit 500 to provide hill hold during downhill vehicle operation. As illustrated in FIGS. 9A-B, the top graphs show an accelerometer grade of the vehicle with respect to time. The middle graphs show a vehicle torque with respect to time, and the bottom graphs show vehicle rollback (in inches) with respect to time. As illustrated in the bottom graphs, embodiments of the invention limit vehicle rollback of the vehicle to 6 inches or less after initiating hill hold state active (HSA) in both uphill and downhill operation.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:
a motor coupled to one or more wheels of a vehicle; and
a resonance suppression control circuit configured to:
generate a motor set torque signal;
generate voltage waveforms that drive the motor, wherein the voltage waveforms are based on the motor set torque signal;
receive a measured motor speed indicator from the motor;
estimate motor torque from the measured motor speed indicator;
estimate shaft torque from the measured motor speed indicator; and
update the motor set torque signal based on the estimated motor torque and estimated shaft torque so that the motor is adjusted to prevent a change in vehicle position.

2. The apparatus of claim 1, wherein the motor is coupled to the one or more wheels via a shaft, and wherein the shaft exhibits shaft stiffness that is used to determine the estimated shaft torque.

3. The apparatus of claim 1, wherein the resonance suppression control circuit adjusts the motor set torque signal which causes the motor to generate a holding torque to oppose changes in road grade, shaft stiffness, or vehicle weight to prevent oscillations in the vehicle position.

4. The apparatus of claim 3, wherein the holding torque is sufficient across a range of road grades, shaft stiffnesses, and vehicle weights to prevent a change in the vehicle position without application of a vehicle brake.

5. The apparatus of claim 1, wherein the resonance suppression control circuit adjusts the motor set torque signal to prevent a change in vehicle position independent from input from a vehicle accelerometer or vehicle wheel speed sensor.

6. The apparatus of claim 1, further comprising an extended state observer apparatus that estimates the shaft torque based on the measured motor speed indicator and the motor set torque signal.

7. The apparatus of claim 1, wherein the resonance suppression control circuit operates in a hill hold control mode where oscillations in the vehicle position do not occur across a range of vehicle weights or shaft stiffnesses.

8. The apparatus of claim 1, wherein the resonance suppression control circuit operates in a hill hold control mode to generate the motor set torque signal to maintain a vehicle speed at zero.

9. The apparatus of claim 1, wherein the resonance suppression control circuit operates across a range of vehicle weights, and wherein the range of vehicle weights is supported without additional tuning of the resonance suppression control circuit.

10. The apparatus of claim 1, wherein the resonance suppression control circuit operates across a range of shaft stiffnesses, and wherein the range of shaft stiffnesses is supported without additional tuning of the resonance suppression control circuit.

11. The apparatus of claim 1, wherein the resonance suppression control circuit operates across a range of road grades, and wherein the range of road grades is supported without additional tuning of the resonance suppression control circuit.

12. A system comprising:
a motor coupled to one or more vehicle wheels; and
a resonance suppression control circuit configured to:
generate a motor set torque signal;
generate voltage waveforms that drive the motor, wherein the voltage waveforms are based on the motor set torque signal;
receive a measured motor speed indicator from the motor;
estimate motor torque from the measured motor speed indicator;
estimate shaft torque from the measured motor speed indicator; and
update the motor set torque signal based on the estimated motor torque and estimated shaft torque so that the motor is adjusted to generate a torque to oppose a disturbance torque present at a motor shaft due to at least one of road grade, shaft stiffness, and vehicle weight, wherein a change in the vehicle weight, the shaft stiffness, or the road grade does not result in additional oscillations in vehicle position.

13. The system of claim 12, wherein the motor is coupled to the one or more vehicle wheels via the motor shaft, wherein the resonance suppression control circuit estimates a shaft torque based on motor speed, and wherein the shaft exhibits a shaft stiffness.

14. The system of claim 12, wherein the torque generated by the motor is sufficient across a range of road grades, shaft stiffnesses, and vehicle weights to oppose the disturbance torque without application of a vehicle brake.

15. The system of claim 12, wherein the resonance suppression control circuit causes the motor to generate the torque independent from input from a vehicle accelerometer or vehicle wheel speed sensor.

16. A system comprising:
a motor coupled to one or more wheels of a vehicle; and
means for:
generating a motor set torque signal;
generating voltage waveforms from the motor set torque signal to drive the motor;
receiving a measured motor speed indicator;
estimating motor torque from the measured motor speed indicator;
estimating shaft torque from the measured motor speed indicator; and
updating the motor set torque signal based on the estimated motor torque and estimated shaft torque so that the motor is adjusted to prevent a change in vehicle position.

17. The system of claim 16, wherein the means comprises a resonance suppression control circuit having an extended state observer.

18. The system of claim 16, wherein the means generates the holding torque across a range of vehicle weights, across a range of shaft stiffnesses, and across a range of road grades without additional tuning of the means.

\* \* \* \* \*